United States Patent [19]

Dirkin et al.

[11] Patent Number: 4,802,404

[45] Date of Patent: Feb. 7, 1989

[54] COMPOSITE CYLINDER ASSEMBLY WITH REMOVABLE LINER ASSEMBLY

[75] Inventors: William Dirkin, Portage; Fred Peters, Richland; Terry L. Benton, Kalamazoo, all of Mich.

[73] Assignee: Pneumo Abex Corporation, Boston, Mass.

[21] Appl. No.: 34,858

[22] Filed: Apr. 6, 1987

[51] Int. Cl.[4] ................................ F16S 10/02
[52] U.S. Cl. ...................................... 92/171; 285/149
[58] Field of Search .................. 92/169 R, 170, 171, 92/128; 285/149

[56] References Cited

U.S. PATENT DOCUMENTS

| | | | |
|---|---|---|---|
| 2,146,218 | 2/1939 | Kimmich et al. | 285/149 |
| 3,083,989 | 4/1963 | Press | 285/149 X |
| 3,334,773 | 8/1967 | Bimba | 92/128 X |
| 3,334,937 | 8/1967 | Jofeh | 92/171 X |
| 4,073,219 | 2/1978 | Bimba | 92/171 X |
| 4,263,841 | 4/1981 | Bimba | 92/171 X |
| 4,449,446 | 5/1984 | Degnan et al. | 92/170 X |
| 4,592,267 | 6/1986 | Renzi | 92/128 |
| 4,671,169 | 6/1987 | Hillier | 92/171 X |
| 4,685,384 | 8/1987 | Dirkin et al. | 92/169 X |

Primary Examiner—Robert E. Garrett
Assistant Examiner—Mark A. Williamson
Attorney, Agent, or Firm—Renner, Otto, Boisselle & Sklar

[57] ABSTRACT

Composite cylinder assembly includes a removable liner assembly consisting of a liner member having circumferential hoop stress windings wrapped thereabout. The ends of the liner assembly freely float on cylindrical end portions on the inner ends of end glands at opposite ends of the cylinder for sliding sealed engagement with ring seals contained in external grooves in such cylindrical end portions. Surrounding the removable liner assembly in radially spaced relation therefrom is a composite outer wall portion having opposite ends threadedly connected to the end glands radially outwardly of the removable liner assembly, whereby disconnecting the ends of the outer wall portion from the end glands will permit removal of the liner assembly as well as the liner seals and outer wall portion for refurbishment and/or replacement as desired.

37 Claims, 3 Drawing Sheets

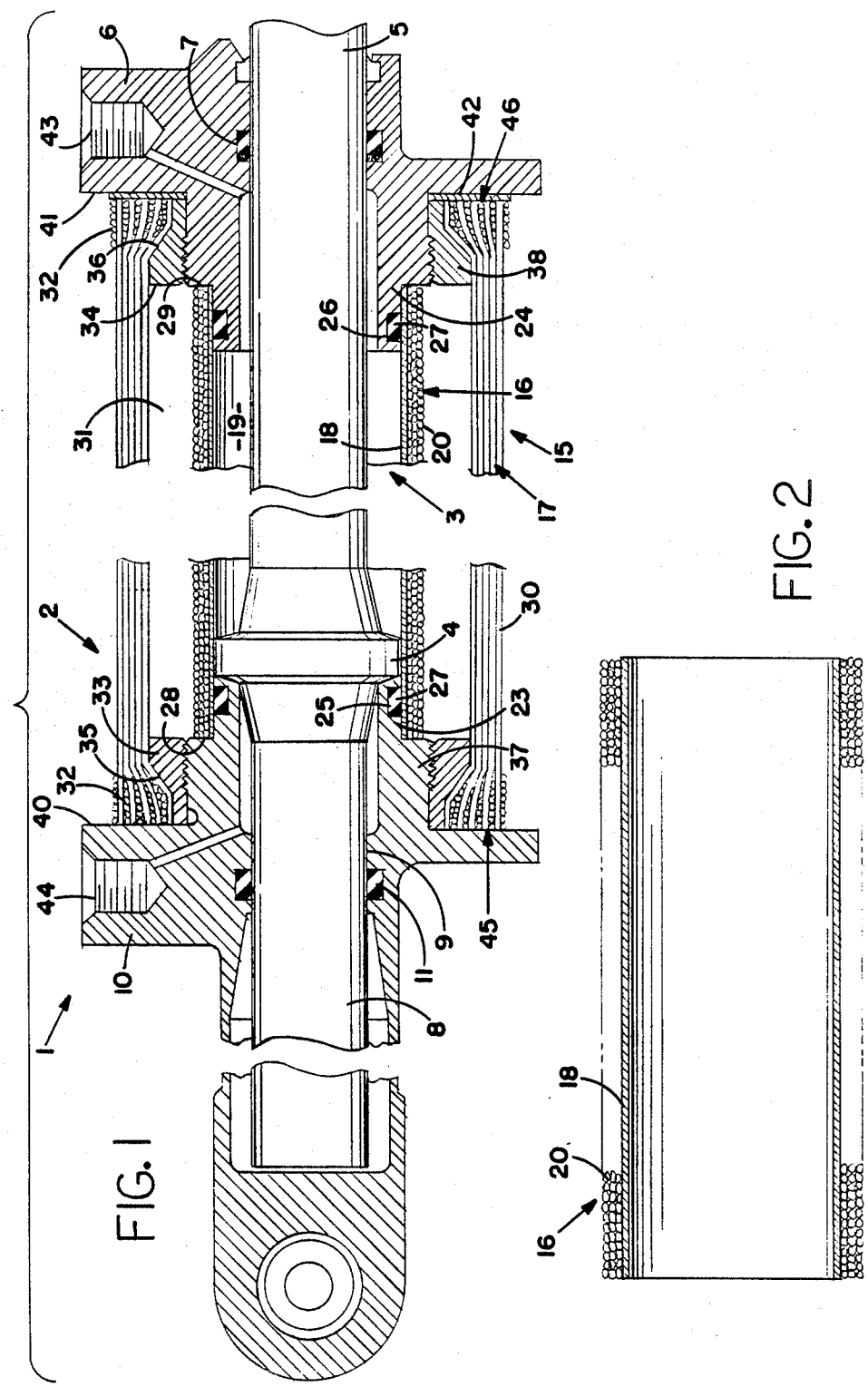

COMPOSITE CYLINDER ASSEMBLY WITH REMOVABLE LINER ASSEMBLY

BACKGROUND OF THE INVENTION

This invention relates generally as indicated to a composite cylinder assembly including a removable liner assembly to facilitate refurbishment and/or replacement of the liner assembly in the event that it should become damaged or unduly worn. The liner assembly is made separately from a composite outer wall portion which is detachable from the cylinder end glands for easy access to the liner asesmbly and liner seals and to facilitate refurbishment and/or replacement of the outer wall portion as well.

In copending U.S. patent applications Ser. Nos. 642,539, now U.S. Pat. No. 4,697,499, granted Oct. 6, 1987, and 834,501, now U.S. Pat. No. 4,685,384, granted Aug. 11, 1987, assigned to the same assignee as the present application, there are shown several different fluid actuator designs intended for use in flight controls of aircraft and other high pressure applications in which the cylinder walls are made of relatively high strength to weight composite materials to provide a substantial reduction in weight of the cylinders without sacrificing strength. In such actuator designs, it has generally been found necessary to provide a wear resistant sleeve or liner impermeable to the hydraulic fluid on the inner diameter of the cylinders because of the relatively porous nature of the composite materials.

One drawback of such actuator designs is that if the liners should become damaged or unduly worn, refurbishment of the cylinders requires cutting out the old liners and replacing them with a new one, which is a difficult and expensive process especially in view of the liner seals which are necessary to make the liners operate properly.

SUMMARY OF THE INVENTION

With the foregoing in mind, it is a principal object of this invention to provide a composite cylinder assembly including a liner assembly which is easily removable therefrom for reworking and/or replacement in the event of damage or undue wear.

Another object is to provide such a composite cylinder assembly in which the liner assembly is free to float on the liner seals, thus allowing the liner assembly to self-align to a degree and thereby substantially reduce wear due to alignment problems and the like.

Still another object is to provide such a composite cylinder assembly of simplified construction which allows standard seal retention and separate proof tests of the individual components without risking damage to the entire assembly.

A further object is to provide such a composite cylinder assembly in which potential thermal or mechanical distortion of the assembly and attendant problems asociated therewith are minimized.

These and other objects of the present invention may be achieved by providing the composite cylinder assembly with a removable liner assembly consisting of a liner sleeve having one or more layers of circumferential or hoop stress windings wrapped thereabout. The ends of the liner assembly are freely slidable over the liner seals to permit the liner assembly to float on the liner seals which are retained in external annular grooves in reduced diameter end portions on the cylinder end glands. Surrounding the liner assembly in radially spaced relation therefrom is an outer wall portion including longitudinal tension fibers which provide a longitudinal tension load path from one end gland to the other, with hoop or circumferential windings interposed between the longitudinal tension windings wherever desired to give the longitudinal tension windings stability and to provide a kick load wherever the longitudinal tension windings change directions.

The ends of the outer wall portion are detachably mounted to the cylinder end glands to permit removal of the liner assembly as well as the liner seals and/or outer wall portion for refurbishment or replacement as desired.

Preferably, the ends of the longitudinal tension windings are attached to end rings which may be threaded onto the end glands to facilitate assembly and disassembly of the outer wall portion from the end glands.

In one form of the invention, the ends of the longitudinal tension windings are trapped between an end face on the end glands and the respective end rings, whereas in another form of the invention, such longitudinal winding ends are trapped between such end rings and retaining end caps on the end glands which substantially completely surround the longitudinal winding ends. Such end caps may also be used to impart a turning torque to the end rings and longitudinal tension windings trapped therebetween by providing a lost motion connection between the end caps and end rings. The longitudinal tension windings may also be pulled radially inwardly intermediate their ends to reduce the outer diameter of the composite cylinder assembly at the center if desired because of space considerations and the like.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but several of the various ways in which the principles of the invention may be employed.

BRIEF DESCRIPTION OF THE DRAWINGS

In the annexed drawings:

FIG. 1 is a schematic fragmentary longitudinal section through one form of composite cylinder assembly in accordance with this invention;

FIG. 2 is an enlarged longitudinal section through a separately constructed liner assembly for the composite cylinder assembly of FIG. 1;

DETAILED DESCRIPTION OF THE PREFERRED EMBODIMENTS

Figure 3:
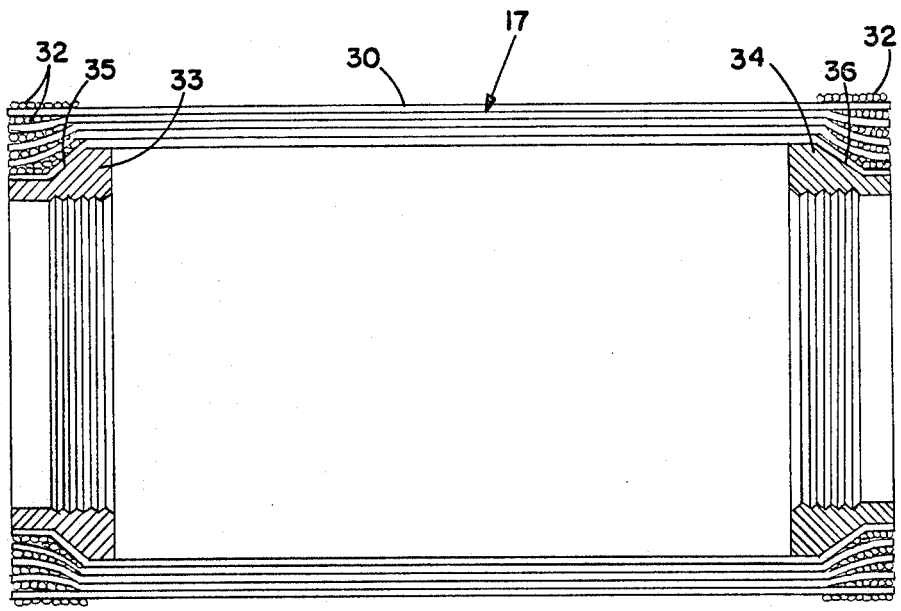
FIG. 3 is an enlarged fragmentary longitudinal section through a separtely constructed composite outer wall portion for the composite cylinder assembly of FIG. 1.

Referring now in detail to the drawings, and initially to FIG. 1, there is schematically shown a fluid actuator 1 including one form of composite cylinder assembly 2 in accordance with this invention having a piston rod assembly 3 axially slidable therein. The piston rod assembly 3 includes a piston head 4 and piston rod 5 extending coaxially from the piston head through an end wall or gland 6 at the outboard end of the cylinder assembly 2. One or more seals 7 may be provided between the end gland 6 and rod 5 to prevent fluid leakage therebetween. Also, if a pressure balanced actuator design is desired, a tail stock 8 having substantially the same outer diameter (O.D.) as the rod 5 may extend from the side of the piston head 4 opposite the rod through an opening 9 in an end gland 10 at the head or inboard end of the actuator, with one or more seals 11 therebetween similar to the seal 7 previously described.

In accordance with one aspect of the invention, the cylinder wall 15 is of a composite construction including a liner assembly 16 surrounded by a separately constructed outer wall portion 17 as described hereafter. The liner assembly 16 consists of a fluid impermeable wear resistant liner member 18 which defines the inner wall of the cylinder chamber 19, and one or more layers of circumferential or hoop stress windings 20 wrapped about the liner member. Liner member 18 is preferably made of a relatively light weight metal such as aluminum that not only acts as a barrier to the hydraulic fluid, but also provides a suitable surface for hard coat which forms an extremely hard wear resistant surface that will withstand the sliding contact at the piston head diameter.

The purpose of the circumferential or hoop stress windings 20 is to keep diametrical expansion of the cylinder wall 15 to a minimum and to protect the cylinder liner 18 from fatigue effects. Such circumferential windings 20 may be made of suitable composite fibers such as high modulus graphite filament wound fibers which have a relatively high tensile strength to resist diametrical growth of the cylinder when high pressure fluid is admitted to either end during extension and retraction of the piston rod assembly. The fibers are impregnated with a suitable resin such as epoxy, polyester, polyimide, etc.

End glands 10, 6 may have reduced diameter cylindrical end portions 23, 24 extending toward each other, with external circumferential grooves 25, 26 therein containing suitable liner seals 27. The O.D. of the cylindrical end portions 23, 24 is somewhat less than the inner diameter (I.D.) of the liner member 18 to facilitate sliding of the ends of the liner member over the cylindrical end portions and into sliding engagement with the seals 27 carried thereby. Thus, in effect, the liner assembly 16 including the liner member 18 with hoop windings 20 wrapped thereabout is free to float on the liner seals 27, allowing the liner member 18 to self-align to a degree, thus minimizing liner wear due to alignment problems and the like. The end glands 10, 6 may also have radially outwardly extending end walls 28, 29 axially outwardly of the liner seals 27 to assist in locating the ends of the liner assembly 16 on the end glands.

The outer cylinder wall portion 17 is formed separately from the liner assembly 16, and includes one or more layers of longitudinal composite fibers 30 which may be biased at a slight angle to each other as desired. The I.D. of the outer wall portion 17 is greater than the O.D. of the liner assembly 16, leaving a gap 31 therebetween to facilitate removal of the liner assembly 16 and/or outer wall portion 17 from the composite cylinder assembly 2 for refurbishment and/or replacement as described hereafter. The longitudinal tension fibers 30 provide for the transfer of tension loads from one end gland 6 or 10 to the other, and like the circumferential windings 20, are desirably made of suitable composite fibers having the required high tensile strength such as high modulus graphite filament wound epoxy impregnated fibers and the like.

Circumferential windings 32 may be interspersed between the longitudinal windings 30 to give the longitudinal windings stability and to provide a kick load wherever the longitudinal windings change direction, for example, at the ends of the longitudinal windings which are shown attached to metal end rings 33, 34.

As clearly shown in FIGS. 1 and 3, end rings 33, 34 have oppositely facing external tapered surfaces 35, 36 to which the ends of the longitudinal tension windings 30 are attached as by wrapping such circumferential windings 32 between each layer of longitudinal tension windings. Also, the I.D. of the end rings 33, 34 is greater than the O.D. of the liner assembly 16, and such end rings may be internally threaded for threaded engagement with exterior threads on additional cylindrical portions 37, 38 on the end glands 6, 10 similarly having an O.D. greater than the O.D. of the liner assembly 16.

To assemble the composite cylinder assembly 2, first one end of the liner assembly 16 is inserted over the reduced diameter end portion 23 of the inboard end gland 10 into sealing engagement with the associated seal 27 and up against the end wall (shoulder) 28. Then one of the end rings 33 of the outer wall portion 17 is threaded onto the inboard end gland 10 by torquing the outer wall portion from the exterior while restraining the inboard end gland 10 against rotation. When the end ring 33 is fully torqued on the inboard end gland 10, the longitudinal fibers 30 at that end of the outer wall portion 17 will be mechanically trapped between a radial end face 40 on the inboard end gland 10 and the ramp surface 35 on the associated end ring 33 as schematically shown in FIG. 1.

Next the reduced diameter end portion 24 of the outboard end gland 6 is inserted into the outboard end of the liner member 18 and such outboard end gland is rotated while the outer wall portion 17 is restrained against rotation to cause the outboard end gland to thread into the other end ring 34 and the associated liner seal 27 to sealingly engage the I.D. of the liner member. The outboard end gland 6 may be sufficiently tightened until the adjacent ends of the longitudinal tension windings 30 are similarly trapped between a radial end face 41 on the outboard end gland and the ramp surface 36 on the end ring 34. If necessary, a shim washer 42 of the desired thickness may be inserted between the radial end face 42 of the outboard end gland 6 and the adjacent ends of the longitudinal tension windings 30 and end ring 34 so that the fluid port 43 in the outboard end gland will line up with the fluid port 44 in the inboard end gland 10 when the end joints 45, 46 at the ends of the outer wall portion 17 are properly preloaded in the manner previously described.

To disassemble the composite cylinder assembly 2, the assembly steps are reversed. That is, first the outboard end gland 6 is unscrewed from the associated end ring 34 of the outer wall portion 17, thus permitting removal of the entire liner assembly 16, shown separately in FIG. 2, for refurbishment and/or replacement as desired. Also, the end ring 33 may be unscrewed from the inboard end gland 10 to permit complete removal of the outer wall portion 17, shown separately in FIG. 3, for ease of replacement or refurbishment of the outer wall portion. Unscrewing both the outboard end gland 6 from the outer wall portion 17 and the outer wall portion from the inboard end gland 10 also facilitates removal and replacement of the liner seals 27.

Such a simplified cylinder assembly 2 construction not only allows replacement of the individual components, but also allows separate proof tests of such individual components without risking damage to the entire assembly. Furthermore, such a composite cylinder assembly minimizes potential thermal or mechanical distortion of the assembly and attendant problems associated therewith.

Figure 4:
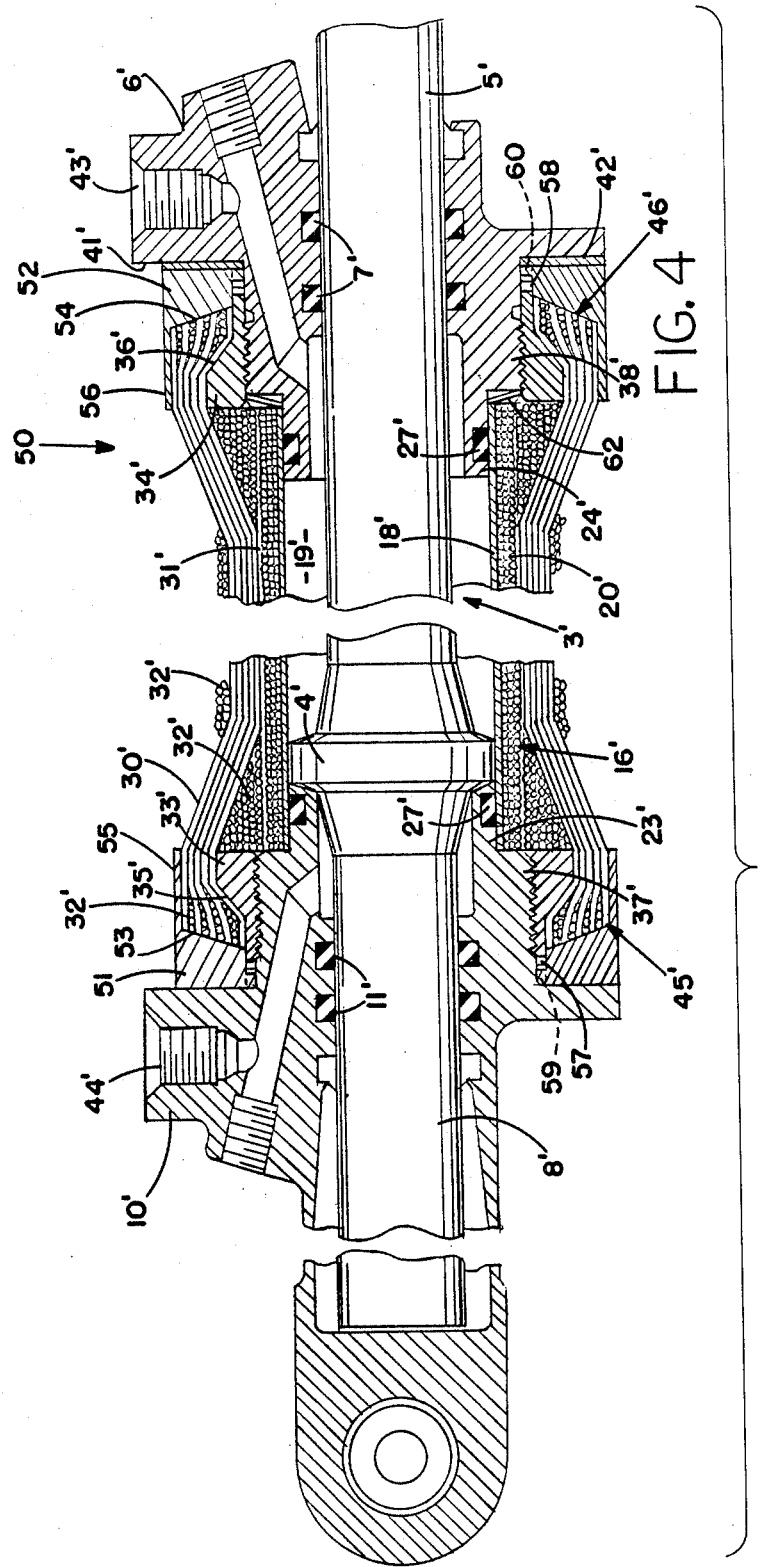
FIG. 4 is a schematic fragmentary longitudinal section through another form of composite cylinder assembly in accordance with this invention.

In FIG. 4 there is shown a modified form of composite cylinder assembly 50 in accordance with this invention which is generally similar to the composite cylinder assembly 1 previously described. Accordingly, the same reference numerals followed by a prime symbol are used to designate like parts. However, the composite cylinder assembly 50 differs from that shown in FIG. 1 in that metal gland retaining end caps 51, 52 are also provided around opposite ends to the longitudinal tension windings 30' of the outer wall portion 17' to provide a more positive mechanical entrapment of such ends and make it easier to thread the end rings 34', 33' onto and off the respective end glands 10', 6'.

Figure 5:
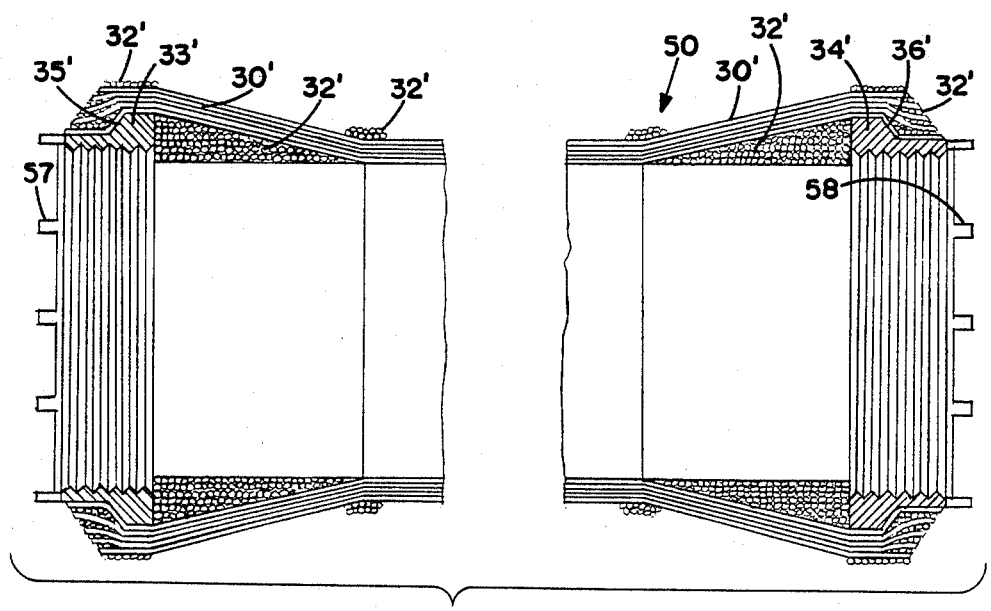
FIG. 5 is an enlarged fragmentary longitudinal section through a separately constructed composite outer wall portion for the composite cylinder assembly of FIG. 4.

The end caps 51, 52 have internal tapered ramp surfaces 53, 54 matching the external tapered ramp surfaces 35', 36' on the respective end rings 33', 34'. However, such tapered ramp surfaces 53, 54 extend radially outwardly beyond the O.D. of the end rings 33', 34' and have cylindrical sleeve portions 55, 56 at the radial outer ends thereof surrounding the end rings in radially outwardly spaced relation therefrom to completely enclose and thus mechanically trap the ends 45', 46' of the longitudinal windings 30' between such end rings 33', 34' and end caps 51, 52 as shown in FIGS. 4 and 5. Also, such end rings 33', 34' may have tabs 57, 58 on the ends thereof that extend into grooves or pockets 59, 60 in the I.D. of the end caps 51, 52 to provide a lost motion drive connection therebetween. Accordingly, when the end caps 51, 52 are rotated in the desired direction relative to the respective end glands 10', 6', as by using two standard wrenches each engaging standard slots (not shown) in the O.D. of the respective end caps and end glands, the end rings 33', 34' will rotate with the end caps thus causing the end rings to move toward the respective end caps to exert the desired preload on the ends 45', 46' of the longitudinal tension windings 30'. The ends of the longitudinal tension windings 30' are thus squeezed to provide pressure from all directions to aid in the transfer of longitudinal tension loads from the longitudinal tension windings to the end glands and vice versa.

Such mechanical joints between the end glands 6', 10' and ends of the longitudinal tension windings 30' prevent fretting between the metal and composite materials by preventing relative movement therebetween. Also, preloading the ends of the longitudinal tension windings in this manner prevents fatigue in the composite materials by preventing or retarding delamination in the composites at the ends, enhances the stiffness in the joints, and prevents free play in the joints. Moreover, such preloading compensates for any thermal expansion that may have occurred between the composite ends and end rings during curing by permitting any gaps between the composite ends and end rings to be loaded out during preloading of the joints.

In accordance with another aspect of the invention, the O.D. of the outer wall portion 17' may be reduced intermediate the ends thereof, if desired because of space considerations, by pulling the longitudinal tension windings 30' in at the center to eliminate most of the gap 31' between the liner assembly 16' and outer wall portions 17' as schematically shown in FIGS. 4 and 5. In order to do that, it is necessary to provide hoop or circumferential windings 32' wherever the longitudinal tension windings 30' change directions to give the longitudinal tension windings stability and to provide a kick load for transferring the longitudinal tension loads from one direction to another.

A shim washer 42' may be interposed between the radial end face 41' of the outboard end gland 6' and outboard end cap 52 to take up any clearance space as may be necessary to cause the fluid port 43' in the outboard end gland to line up with the fluid port 44' in the inboard end gland 10' when the end joints 45', 46' are properly preloaded as aforesaid. In addition, a wave spring washer 62 may be inserted between one end of the liner assembly 16' and the adjacent end wall 29' of one of the end glands 6' to take up any axial play that may exist therebetween when the end joints are properly preloaded.

From the foregoing, it wil now be apparent that the composite cylinder assembly of the present invention is of a simplified construction which provides for the easy removal of the liner member for refurbishment and/or replacement if damaged or unduly worn. Also, such a composite cylinder assembly permits refurbishment and/or replacement of the liner seals as well as the composite outer wall portion, and allow separate proof tests of individual components without risking damage to the entire assembly. In addition, such a composite cylinder assembly allows the liner member to self-align to a degree, thus minimizing wear on the liner member due to alignment problems and the like, and minimizes the potential for thermal or mechanical distortion of the cylinder assembly, which should obviate drag and friction problems often encountered in fluid cylinders.

Although the invention has been shown and described with respect to certain preferred embodiments, it is obvious that equivalent alterations and modifications will occur to others skilled in the art upon the reading and understanding of the specification. The present invention includes all such equivalent alterations and modifications, and is limited only by the scope of the claims.

What is claimed is:

1. A composite cylinder assembly comprising axially spaced apart end glands having axially inwardly extending cylindrical end portions with external grooves containing seal means, a removable liner assembly comprising a liner member having circumferential hoop stress windings wrapped about said liner member, said liner member having opposite ends axially slidable onto said cylindrical end portions of said end glands and into direct sealing engagement with said seal means, and an outer wall portion surrounding said removable liner assembly, end rings affixed to opposite ends of said outer wall portion, said end rings having releasable connection means with the respective end glands, said outer wall portion being separate from said removable liner assembly, the inner diameter of said end rings being greater than the outer diameter of said removable liner assembly to permit removal of said liner assembly from said end glands and outer wall portion upon disconnecting said end rings from said end glands.

2. The assembly of claim 1 wherein said releasable connection means comprises threaded connections between said end rings and said end glands.

3. The assembly of claim 1 wherein said outer wall portion comprises longitudinal tension windings formed separately from said removable liner assembly.

4. The assembly of claim 3 wherein there is an annular air gap between said longitudinal tension windings of said outer wall portion and said hoop stress windings of said removable liner assembly.

5. A composite cylinder assembly comprising a cylinder containing a hydraulic chamber having end glands at opposite ends thereof, a removable liner assembly surrounding said hydraulic chamber, said removable liner assembly comprising a liner member having circumferential hoop stress windings wrapped about said liner member, seal means providing direct sealing engagement between said end glands and opposite ends of said liner member at opposite ends of said hydraulic chamber, said liner member extending axially beyond said seal means at said opposite ends of said hydraulic chamber, an outer wall portion surrounding said removable liner assembly, said outer wall portion being separate from said liner assembly and icluding longitudinal tension windings having an inner diameter greater than the outer diameter of said removable liner assembly, and end rings at opposite ends of said outer wall portion to which opposite ends of said longitudinal tension windings are affixed, said end rings having releasable connection means with said end glands, each of said end rings having an inner diameter greater than the outer diameter of said removable liner assembly to permit removal of said liner assembly from said end glands and outer wall portion upon disconnecting said end rings from said end glands.

6. The assembly of claim 5 wherein said releasable connection means comprise threaded connections between said end rings and said end glands radially outwardly of said removable liner assembly.

7. The assembly of claim 5 wherein there is an annular air gap between said longitudinal tension windings of said outer wall portion and said removable liner assembly.

8. The assembly of claim 7 wherein said longitudinal tension windings extend radially inwardly intermediate the ends thereof to reduce the outer diameter of said outer wall portion intermediate its ends while still leaving said annular air gap between said outer wall portion and said removable liner assembly.

9. A composite cylinder assembly comprising axially spaced apart end glands having axially inwardly extending cylindrical end portions with external grooves containing seal means, a removable liner assembly comprising a liner member having circumferential hoop stress windings wrapped about said liner member, said liner member having opposite ends axially slidable onto said cylindrical end portions of said end glands and into direct sealing engagement with said seal means, and an outer wall portion surrounding sadi removable liner assembly, said outer wall portion having opposite ends connected to said end glands, one of said ends of said outer wall portion having releasable connection means with one of said end glands, said outer wall portion being separate from said removable liner assembly whereby removal of said one end gland from said one end of said outer wall portion will permit removal of said removable liner assembly from within said outer wall portion for refurbishment and/or replacement, said outer wall portion comprising longitudinal tension windings formed separately from said removable liner assembly, and longitudinal tension windings of said outer wall portion and said hoop stress windings of said removable liner assembly having a gap therebetween, and end rings affixed to opposite ends of said longitudinal tension windings of said outer wall portion, each of said end rings having releasable connection means with the respective end glands, the inner diameter of said end rings being greater than the outer diameter of said removable liner assembly to permit removal of said liner assembly from said end glands and outer wall portion upon disconnecting said end rings from said end glands.

10. The assembly of claim 9 wherein said releasable connection means comprise threaded connections between said end rings and end glands.

11. The assembly of claim 10 wherein said end glands have threaded cylindrical portions radially outwardly of said cylindrical end portions for threaded engagement by said end rings.

12. The assembly of claim 11 wherein said cylindrical end portions have radial shoulders axially outwardly of said seal means for locating the ends of said liner assembly on said cylindrical end portions.

13. The assembly of claim 9 wherein said end rings have oppositely facing external ramp surfaces to which the ends of said longitudinal tension windings are affixed, and said end glands have radial end faces which cooperate with said external ramp surfaces on said end rings to trap the ends of said longitudinal tension windings therebetween when said end rings are fully torqued on the respective end glands.

14. The assembly of claim 13 wherein said end glands have fluid ports therein communicating with opposite ends of said cylinder assembly, and shim means are inserted between the radial end face on one of said end glands and an adjacent end of said outer wall portion to facilitate the lining up of said fluid ports when said end rings are fully torqued on the respective end glands.

15. The assembly of claim 9 wherein said end rings have oppositely facing external ramp surfaces to which the ends of said longitudinal tension windings are attached, and end caps surround said end rings, said end caps having internal ramp surfaces substantially matching the external ramp surfaces on said end rings, and internal cylindrical surfaces surrounding said end rings in radially spaced relation therefrom for mechanically trapping the ends of said longitudinal tension windings between said end caps and end rings.

16. The assembly of claim 15 wherein said end caps are positioned between radial end faces of said end glands and the ends of said longitudinal tension windings.

17. The assembly of claim 16 wherein said end caps are freely rotatable with respect to said end glands and have rotatable drive connections with said end rings, whereby rotation of said end caps will cause a corresponding rotation of said end rings and the ends of the longitudinal tension windings trapped therebetween.

18. The assembly of claim 17 wherein said end glands have fluid ports therein communicating with opposite ends of said cylinder assembly, and shim means are provided between the radial end face on one of said end glands and the associated end cap to facilitate the lining up of said fluid ports when said end rings are fully torqued on the respective end glands.

19. The assembly of claim 9 wherein said end rings have oppositely facing external ramp surfaces to which the ends of said longitudinal tension windings are affixed, and there are end caps adjacent the ends of said longitudinal tension windings, said end caps having internal ramp surfaces facing the external ramp surfaces on said end rings for mechanically trapping the ends of said longitudinal tension windings between said end caps and end rings.

20. The assembly of claim 19 wherein said end caps have internal cylindrical surfaces surrounding said end rings in radially spaced relation which further assist in mechanically trapping the ends of said longitudinal tension windings between said end caps and end rings.

21. The assembly of claim 19 wherein said end caps are positioned between radial end faces of said end glands and the ends of said longitudinal tension windings.

22. The assembly of claim 21 wherein said end caps are freely rotatable with respect to said end glands and have rotatable drive connection means with said end rings, whereby rotation of said end caps will cause a corresponding rotation of said end rings and the ends of said longitudinal tension windings trapped therebetween.

23. A composite cylinder assembly comprising axially spaced apart end glands having axially inwardly extending cylindrical end portions with external grooves containing seal means, a removable liner assembly comprising a liner member having circumferential hoop stress windings wrapped about said liner member, said liner member having opposite ends axially slidable onto said cylindrical end portions of said end glands and into direct sealing engagement with said seal means, and an outer wall portion surrounding said removable liner assembly, said outer wall portion having opposite ends connected to said end glands, one of said ends of said outer wall portion having releasable connection means with one of said end glands, said outer wall portion being separate from said removable liner assembly whereby removal of said one end gland from said one end of said outer wall portion will permit removal of said removable liner assembly from within said outer wall portion for refurbishment and/or replacement, said outer wall portion comprising longitudinal tension windings formed separately from said removable liner assembly, said longitudinal tension windings of said outer wall portion and said hoop stress windings of said removable liner assembly having an annular air gap therebetween, said longitudinal tension windings extending radially inwardly intermediate the ends thereof to reduce the outer diameter of said outer wall portion intermediate its ends while still leaving said annular air gap between said outer wall portion and said removable liner assembly.

24. The assembly of claim 23 further comprising hoop windings wrapped about said longitudinal tension windings in the regions where said longitudinal tension windings change direction.

25. The assembly of claim 24 further comprising filler material for supporting the interior of said longitudinal tension windings in the regions where said longitudinal tension windings extend at an angle from opposite ends thereof toward the middle to provide such reduced outer diameter intermediate the ends of said longitudinal tension windings.

26. The assembly of claim 25 wherein said filler material comprises additional hoop windings which form an integral part of said outer wall portion.

27. A composite entrapment joint for an axial load member including a wall portion made from longitudinal tension windings, a first member received within one end of said wall portion, means providing an external ramp surface on said first member facing axially outwardly from within said one end, means for attaching said one end to said external ramp surface, a second member having an internal ramp surface facing said external ramp surface axially outwardly of said one end, and means for moving one of said ramp surfaces toward the other of said ramp surfaces for mechanically trapping said one end of said wall portion between said ramp surfaces, said means providing said external ramp surface on said first member comprising an end ring surrounding said first member, said end ring having a threaded connection with said first member.

28. The joint of claim 27 wherein said first member comprises an end gland of a composite cylinder assembly.

29. The joint of claim 27 wherein said second member comprises a cap member inserted over said first member.

30. The joint of claim 27 wherein said means for moving said one ramp surface toward said other ramp surface comprises a member having a threaded connection with said first member which when rotated in one direction causes said one ramp surface to move toward said other ramp surface.

31. The joint of claim 27 wherein said ramp surfaces on said first and second members substantialy match each other.

32. The joint of claim 27 wherein said second member has an internal cylindrical surface surrounding said first member in radially spaced relation to further assist in mechanically trapping said one end of said wall portion between said ramp surfaces.

33. The joint of claim 27 wherein said means for attaching said one end of said wall portion to said external ramp surface comprises circumferential windings wrapped around said one end.

34. The joint of claim 27 wherein said circumferential windings are wrapped between plural layers of said longitudinal tension windings at said one end of said wall portion.

35. A composite entrapment joint for an axial load member including a wall portion made from longitudinal tension windings, a first member received within one end of said wall portion, means providing an external ramp surface on said first member facing axially outwardly from within said one end, means for attaching said one end to said external ramp surface, a second member having an internal ramp surface facing said external ramp surface axially outwardly of said one end, and means for moving one of said ramp surfaces toward the other of said ramp surfaces for mechanically trapping said one end of said wall portion between said ramp surfaces, said second member having an internal cylindrical surface surrounding said first member in radially spaced relation to further assist in mechanically trapping said one end of said wall portion between said ramp surfaces, said first member comprising an end gland, and said second member comprising a cap member inserted over said end gland, said cap member being positioned between a radial end face of said end gland and said one end of said wall portion.

36. The joint of claim 35 wherein said means providing said external ramp surface on said end gland comprises an end ring having a threaded connection with said end gland.

37. The joint of claim 35 wherein said end cap member is freely rotatable with respect to said end gland and has rotatable drive connection means with said end ring, whereby rotation of said cap member will cause a corresponding rotation of said end ring and said one end of said wall portion trapped therebetween.

* * * * *